United States Patent [19]
Pöschl

[11] Patent Number: 5,593,480
[45] Date of Patent: Jan. 14, 1997

[54] APPARATUS FOR THE OXYGEN ENRICHMENT OF AIR

[75] Inventor: Günter Pöschl, Schwaikheim, Germany

[73] Assignee: PPV Verwaltungs AG, Zurich, Switzerland

[21] Appl. No.: 495,600

[22] PCT Filed: Jan. 10, 1994

[86] PCT No.: PCT/EP94/00049

§ 371 Date: Jul. 11, 1995

§ 102(e) Date: Jul. 11, 1995

[87] PCT Pub. No.: WO94/15698

PCT Pub. Date: Jul. 21, 1994

[30] Foreign Application Priority Data

Jan. 15, 1993 [DE] Germany .................. 43 00 988.3

[51] Int. Cl.$^6$ .................................................. B01D 53/047
[52] U.S. Cl. ......................... 96/124; 96/130; 96/133; 96/144; 96/149
[58] Field of Search ............................. 96/108, 121, 124, 96/130, 133, 140

[56] References Cited

U.S. PATENT DOCUMENTS

| | | | |
|---|---|---|---|
| Re. 35,099 | 11/1995 | Hill | 96/124 X |
| 3,069,830 | 12/1962 | Skarstrom et al. | 96/130 X |
| 4,750,465 | 6/1988 | Rediker, Jr. et al. | 96/144 X |
| 4,925,464 | 5/1990 | Rabenau et al. | 96/124 |
| 4,963,168 | 10/1990 | Spencer | 96/130 X |
| 5,119,791 | 6/1992 | Gifford et al. | 96/144 X |

FOREIGN PATENT DOCUMENTS

| | | |
|---|---|---|
| 0049739 | 4/1982 | European Pat. Off. . |
| 0480797 | 4/1992 | European Pat. Off. . |
| 1544036 | 7/1969 | Germany . |
| 2341744 | 3/1974 | Germany . |
| 2556097 | 6/1976 | Germany . |
| 2746673 | 4/1979 | Germany . |
| 2854710 | 7/1980 | Germany . |
| 3238969 | 4/1984 | Germany . |
| 3939518 | 6/1991 | Germany . |
| 4106547 | 9/1992 | Germany . |
| 4300988 | 4/1994 | Germany . |
| 1097112 | 12/1967 | United Kingdom . |

OTHER PUBLICATIONS

H. Hütten, Motoren, 1982, Motorbuch Verlag Stuttgart, p. 114.

*Primary Examiner*—Robert Spitzer
*Attorney, Agent, or Firm*—John R. Ley; John B. Phillips

[57] ABSTRACT

For the oxygen enrichment of air two containers (11,11') working according to a pressure change process are provided. Each container (11, 11') is partly filled with a packed zeolite bed (13, 13'). Compressed air is fed to one container via a common closure device (41). At a certain pressure value a chamber (27) disposed in the container. (11) opens, with oxygen-enriched air flowing into the chamber. The oxygen-enriched air leaves the container (11) via an ascending pipe (37) and can be used as combustion air in internal combustion engines or the like. The one container (11) adsorbs the nitrogen from the compressed air through its packed zeolite bed (13), while the other container (11'), the chamber of which is closed, is desorbed. An oscillation generator (25) can be used to cause the packed zeolite beds (13, 13') to oscillate at high frequency and in this way to increase the adsorbing capacity and to accelerate the desorption process.

22 Claims, 2 Drawing Sheets

APPARATUS FOR THE OXYGEN ENRICHMENT OF AIR

DESCRIPTION

1. Technical Field

This invention refers to an apparatus according to the preamble of claim 1.

2. Background Art

An apparatus of this type is disclosed in the DE 41 06 547 A1. In order to enrich air with oxygen, according to this publication the nitrogen present in air is adsorbed in an adsorptive pressure change process by an adsorbent such as a packed zeolite bed. The packed zeolite bed is disposed in a container having several inlets and outlets through which compressed air is introduced or oxygen-enriched air is let out, respectively. The packed zeolite bed acts here as a molecular sieve. As the operational time increases, however, the adsorbing capacity of the packed zeolite bed diminishes, since it is increasingly saturated with nitrogen molecules. To increase the adsorbing capacity of the packed zeolite bed again, it is subsequently desorbed. The desorption is achieved by flushing the packed bed with oxygen or air, or by evacuating the container. For this purpose, additional inlets and outlets are provided on the container, serving for the evacuation or flushing of the container. According to the DE 41 06 547 A1, several containers are provided, containing a packed zeolite bed, such containers working according to the pressure change process. This means that while oxygen-enriched air is being produced in one container, the other containers are being desorbed. As soon as the adsorbing capacity of the container producing the oxygen-enriched air diminishes, the feed stream of compressed air is interrupted and the container is desorbed, while another container simultaneously takes over the production of oxygen-enriched air. The disadvantage of the apparatus shown in the DE 41 06 547 A1 for executing the process claimed therein is that it requires a greater deal of control and regulation to guarantee the opening and closing of the numerous valves at certain pressures and at certain times.

An apparatus for the adsorptive purification of gases is known from the DE 27 46 673 C2, the apparatus comprising an outer container and a double-walled, movable inner container spaced from the outer container. Such two-walled apparatus are used especially if the adsorbent is heated up for the desorption. In order to keep the outer container free of stresses resulting from thermal expansion, a thin-walled inner container is provided in the DE 27 46 673 C2, and an insulating layer is arranged between the inner and outer containers. The adsorbent is placed in the inner container. To avoid pressure loads on the inner container, the region between the outer and the inner container is open to the interior with the adsorbent, so that a pressure compensation can take place. The inner container is thus exposed solely to thermal expansions. Control possibilities for the opening and closing of the container inlets and outlets are not described in this publication. The apparatus shown is elaborate and expensive, particularly due to the provision of special material for the inner container.

When an adsorbent is desorbed, it is usually flushed with air under low pressure. When the container with the desorbed adsorbent is switched back to the oxygen enrichment of air or to the separation of air components, scavenging air or scavenging air with desorbed nitrogen is inevitably present in the feed and drainage systems of the container. When the pipes are opened these gas mixtures are then released, whereby the purity of product gases is lowered. In order to increase the purity of the product gases, a process is known from the DE 29 32 333 C2, in which the relatively impure product gas is vented into the atmosphere at the beginning of each flowthrough phase. Although such a process does increase the purity of the product gas, this takes place at the expense of the production time.

An apparatus for separating a gas mixture is further known from the DE 32 38 969 A1, which apparatus works according to the pressure change process and in which a control disk arrangement disposed between two alternately working containers holding the adsorbent is located and controls the adsorption and desorption phases of the containers. As the adsorption of the nitrogen in the packed zeolite bed does not take place until a certain pressure value has been reached, the outlet orifice may be opened at this pressure at the earliest, as the air would otherwise exit unfiltered. In a control disk arrangement rotating at a constant speed, the outlet orifice is opened independently of the internal pressure in the adsorption container. An apparatus of this type, with a control disk arrangement, can therefore only function adequately if the pressure progressions are always exactly the same during recurring phases. This requires a great deal of control and regulation. In one embodiment, the DE 32 38 969 A1 provides for numerous valves and one special valve per container instead of the control disk arrangement, the special valve not being opened until a certain atmospheric pressure has been reached. The numerous valves, however, make this embodiment costly and prone to breakdowns.

DISCLOSURE OF INVENTION

The object of the invention is to improve an apparatus according to the preamble of claim 1 such that it can be manufactured and operated economically and such that it can be easily controlled, without a reduction in the degree of purity of the product gases produced by means of the apparatus.

The object is carried out according to the invention by the features of claim 1.

According to the invention, a separate chamber is provided in the container holding a packed zeolite bed, which chamber can be opened and gastightly closed relative to the interior of the container. During the adsorption phase, the chamber is opened in order that oxygen-enriched air can flow into the same. Contrary to this, in the desorption phase the chamber is gastightly closed, so that no scavenging air or nitrogen can flow into the chamber and thereby lower the degree of purity of the oxygen-enriched air flowing out through the chamber. The oxygen-enriched air can leave the container via a chamber outlet connected to a container outlet. Since, however, according to the invention solely oxygen-enriched air can flow into the chamber and the chamber is completely closed during the desorption phase, no compressed air or scavenging air and no nitrogen can enter a conduit between the chamber outlet and the container outlet either. According to the invention, the chamber is located inside the container. Therefore, there is in addition no need for a conduit between the container and the chamber, in which air not enriched with oxygen could remain, which air would lower the degree of purity of the product gases at the start of the adsorption phase. According to the invention the opening and gastight closing of the chamber takes place by means of the international container pressure itself, i.e. the chamber needs no actuating device of its own.

The chamber according to the invention comprises an upper and a lower portion. The upper and lower portions are separated from one another by means of the internal container pressure, this advantageously not taking place until a defined pressure value in the container has been reached. As soon as this pressure value is reached, an annular gap is produced, by which oxygen-enriched air flows from the container into the chamber. The annular gap serves as chamber inlet and with this offers the advantage, over a simple inlet bore, that oxygen-enriched air can enter the chamber over a larger area.

Advantageous embodiments of the invention form the subject matters of the subclaims.

An ascending pipe forming the connection between the chamber outlet and the container outlet according to the embodiment of the invention in claim 2 is securely fastened to the movable wall. If the internal container pressure is low, the chamber is closed. If the internal pressure rises, the movable wall expands and opens the chamber via the ascending pipe. Outlet valves connected to pressure sensors and opened from a certain pressure onward, are therefore unnecessary.

The opening and closing of the chamber is accomplished in a simple manner in the embodiment of the invention according to claim 3 in that the container itself has a flexible wall movable by the internal container pressure.

As the packed zeolite bed is subject to a certain wear, it can happen that zeolite dust from the packed zeolite bed can get into the chamber. To avoid clogging of the ascending pipe by the zeolite dust, in the embodiment of the invention according to claims 4 and 5 a particle filter is disposed before the container outlet or in the chamber before the ascending pipe. In addition, a particle filter can also be mounted before the chamber inlet.

The ability of zeolites to selectively adsorb certain molecules in preference to other molecules diminishes as the operating time increases, so that the packed zeolite bed must be desorbed again. The therefore necessary but brief cycle times of adsorption and desorption can be lengthened by an increase in the adsorptive ability of zeolites. This is achieved by the embodiment of the invention according to claim 6, in which an oscillation generator causing the packed zeolite bed to oscillate at a high frequency is connected to the container. As it is assumed that the molecules to be adsorbed settle in pore interstices of the zeolite, by the oscillation of the packed zeolite bed additional pore interstices become free to capture nitrogen molecules. The pressure value at which nitrogen settles on the zeolites in the apparatus according to the invention can be lowered relative to previous apparatus from approximately 3 bars to 2 to 2.5 bars. Furthermore, the oscillating packed zeolite bed can be more rapidly and thoroughly desorbed.

A piezoelement according to claim 7 can serve as the oscillation generator, which piezoelement is operated via a frequency generator.

It is further advantageous to provide one single closure means according to claim 8, to commonly control the container inlet for air and for scavenging air, and the container outlet for nitrogen. The control becomes far more simple and economical due to the common closure means. In addition, the closure means makes it possible to provide a common container inlet for compressed air and scavenging air according to claim 9, with compressed air or scavenging air flowing alternately via the closure means, depending upon which work phase the container is in at the moment.

The container outlet for nitrogen is opened in the desorption phase, so that a sudden pressure reduction takes place in the container. With this opening and the pressure reduction the strength of the bonds between the nitrogen molecules and the zeolite is so greatly reduced that the nitrogen separates from the zeolite and flows out via the container outlet. The more thoroughly the packed zeolite bed is desorbed in this, the more nitrogen is filtered out in the subsequent adsorption phase. According to claim 10, in addition, scavenging air is briefly introduced into the packed zeolite bed. By this means further nitrogen molecules are dissolved from the packed zeolite bed, so that the desorption is more complete.

According to claim 11, a check valve preventing gases from flowing into the chamber when pressure drops is mounted at the container outlet for oxygen-enriched air. If an ascending pipe is provided, the check valve is preferably mounted at the upper end of the same.

The chamber should not be opened until a certain pressure value has been reached. To enable this pressure value to be precisely set, in the invention according to claim 12 an additional pressure adjusting means is provided. This pressure adjusting means is, according to claim 13, a mechanical prestressing device, with the flexible wall of the container being mechanically prestressable by said device. By this means not only an exact setting of the pressure value, but also a compensation of different temperatures of the wall of the container is possible. If, namely, the wall has another temperature, it is therefore more flexible, and the chamber will already open at a lower pressure value.

Advantageously, according to claim 14 (as partly proposed in the prior art), at least two containers working reciprocally are provided. This makes possible a virtually continuous output of oxygen-enriched air.

The control of the inlets and outlets of several containers is carried out according to claim 15 by a closure means designed as a rotary slide valve and connected to all inlets and outlets of the container. Rotary slide valves are already known from the DE-AS 15 44 036, DE 25 56 097 C2 and DE 32 38 969 A1 and are less susceptible to breakdowns than conventional valves, especially with the pressure change process, in which great pressure differences and frequent switching are necessary.

In an advantageous embodiment of the invention according to claims 16 to 18, a valve body of the rotary slide valve has an inlet bore on one face and an outlet bore on an opposite, second face. The inlet and outlet bores are connected via one radial bore each with one first or second groove, respectively, on the periphery of the valve body. As the desorption only takes place at low pressure in the container, the inner excess pressure existing in the container at the end of the adsorption phase must be reduced as quickly as possible. According to the invention, all bores or grooves through which the nitrogen flows out therefore have a larger cross-sectional area than the bores or the grooves via which the compressed air or scavenging air flows into the container.

Zeolite dust is also partly blown into the closure means via the container outlet for nitrogen, leading in time to wear on the fits in the closure means, since zeolite is extremely hard. The life, for instance of a rotary slide valve, can be lengthened by manufacturing the rotary slide valve and/or the valve housing with ceramic material in accordance with claim 21.

The oxygen-enriched air produced with the aid of zeolites can conventionally be used for chemical processes or in hospitals and ambulances, for respirating patients. In addition, it has already been proposed in the DE-OS 23 41 744 to filter out the nitrogen oxides in the exhaust gas stream of power plants fired with fossil fuels or of internal combustion engines. With the apparatus according to the invention, however, when it is used in a motor vehicle, it is not the exhaust gas already produced that is freed of nitrogen oxides, but rather the formation itself of nitrogen oxides is prevented altogether by already filtering nitrogen out of the combustion air prior to the combustion of hydrocarbons. Hence, hardly any nitrogen oxides are found in the exhaust gas of an internal combustion engine or a burner supplied with oxygen-enriched air.

The nitrogen filtered out by the apparatus according to the invention is used for inerting tanks for inflammable materials. Among these, for example, are fuel tanks for aeroplanes or fuel tanks on lorries or lorries with trailers.

An embodiment of the invention is described in more detail below, with reference to the drawings.

BEST MODE OF CARRYING OUT THE INVENTION

Figure 1:
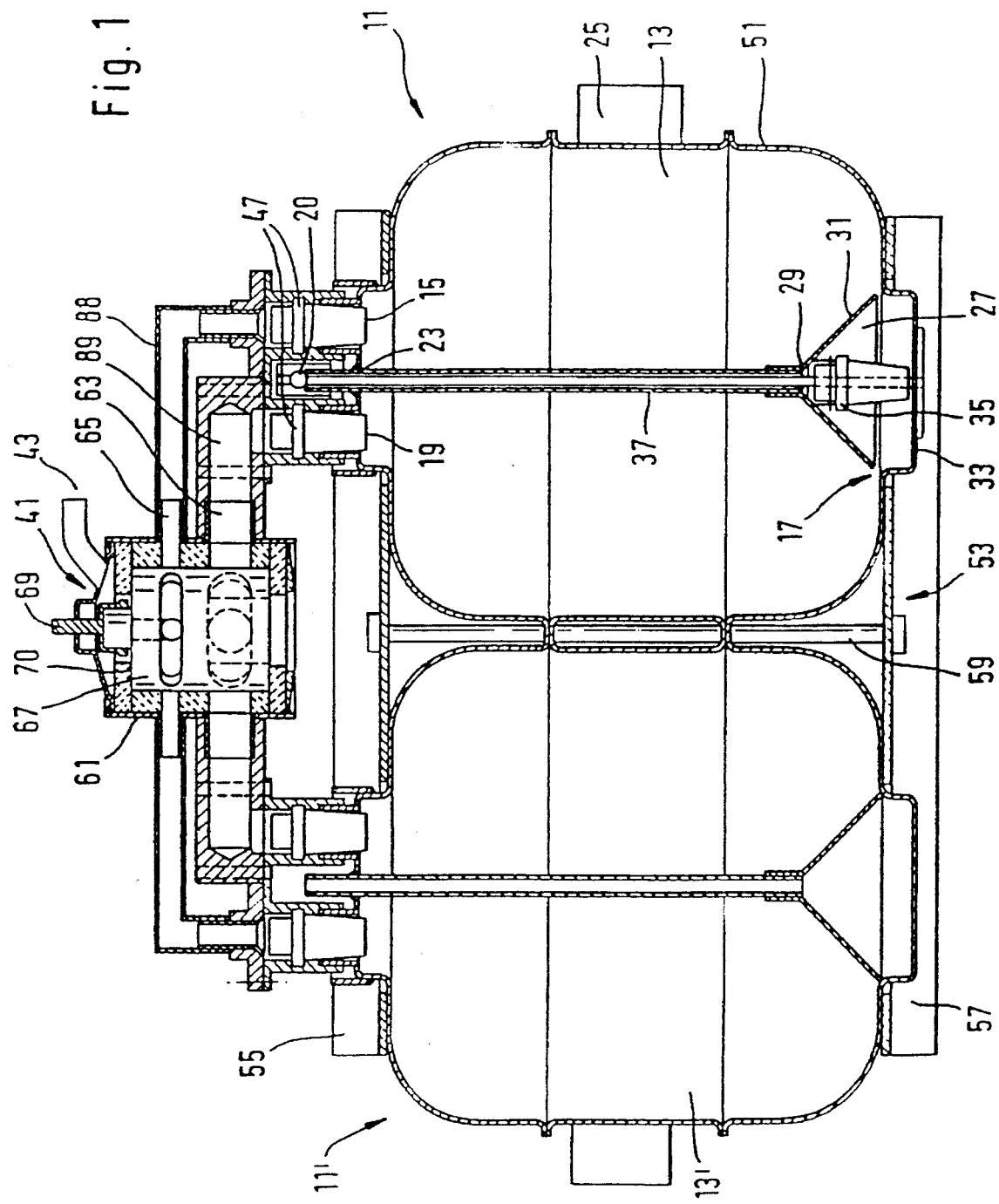
FIG. 1 shows a cross section through an apparatus according to the invention, with two reciprocally working containers interconnected by a closure means.

FIG. 1 shows two upright containers 11, 11', each having a flexible wall 51 and each having a packed zeolite bed 13, 13' arranged therein The two containers 11, 11' are identically constructed, for which reason in the following only the structure of the right-hand container 11 is explained. An oscillation generator 25 in the form of a piezoelement is fixed to the wall 51 of the container 11 in the region of the packed zeolite bed 13. The piezoelement can be caused to oscillate with high frequency by a frequency generator not shown. The container 11 has at its upper end a container inlet 15 for compressed air and scavenging air and a container outlet 19 for nitrogen, each being provided with particle filters 47 to prevent zeolite dust from leaving the container 11. In the container 11, at its lower end, a separate chamber 27 is provided, capable of being opened and gastightly closed relative to the interior of the container 11. The chamber 27 herein comprises a funnel-shaped upper portion 31 and a lower portion 33 formed by a cylindrical hollow in the bottom of the container 11. As depicted in FIG. 1, the chamber 27 in the container 11 is opened and the corresponding chamber in the container 11' is closed. In its opened state the chamber 27 has an annular chamber inlet 17 formed between the upper and the lower parts 31, 33. The chamber 27 has at the uppermost end of its upper portion 31 a chamber outlet 29 having fastened thereon an ascending pipe 37 extending upward from the chamber outlet 29, centrically through the container 11, and penetrating the wall 51 at a container outlet 23 for oxygen-enriched air. The ascending pipe 37 accordingly projects upward beyond the wall 51 of the container 11 and is welded to the wall 51 of the container 11 at the container outlet 23. A check valve 20 is provided at the upper, face end of the ascending pipe 37 and can close off the ascending pipe, and a particle filter 35 is provided at the lower, chamber end of the ascending pipe 37.

The two adjacent containers 11, 11' are resiliently prestressable in an axial direction by a common pressure adjusting device 53. The pressure adjusting device consists of an upper and a lower plate 55, 57, with the upper plate 55 lying on the outside against the tops and the lower plate 57 lying on the outside against the bottoms of the two containers 11, 11'. The upper plate 55 is recessed in the region of the container inlet 15 for compressed air and scavenging air, of the container outlet 19 for nitrogen and of the container outlet 23 for oxygen-enriched air. The lower plate 57 is likewise recessed in the region of the lower part 33 of the chamber 27. The distance between the two plates 55 and 57 can be adjusted with several expansion screws 59 arranged between the containers 11, 11' and connecting the two plates 55 and 57. By this means the prestress exerted on the containers 11, 11' can be altered.

The two containers 11, 11' are connected as shown in FIG. 1 in the same way in each case by one common, controllable closure means 41, for which reason, to simplify matters, in the following merely the connection of the container 11 to the closure means 41 is described in detail. The container inlet 15 for compressed air and scavenging air and the container outlet 19 for nitrogen of the container 11 are connected by conduits 88 and 89, respectively, to the common closure means 41. The closure means 41 itself is designed as a rotary slide valve and comprises a cylindrical valve housing 61 and a valve body 67 disposed therein. The valve body 67 is connected at its upper face 70 to a rotary drive 69, provided here in the form of a d.c. motor, its rotating speed therefore being infinitely variable. Of the rotary drive 69, merely the motor shaft is shown. The closure means 41 has a connection to a compressed air source 43 at its upper end.

Figure 2:
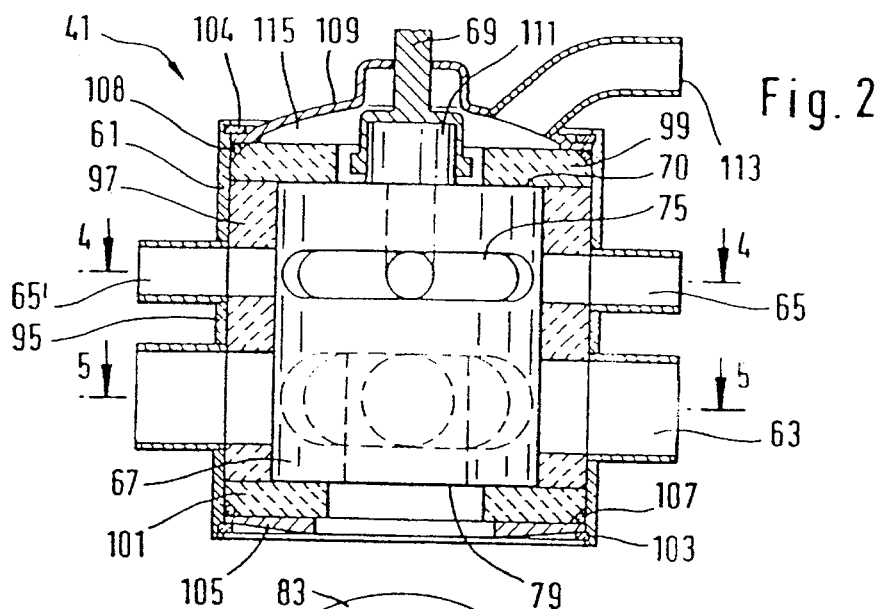
FIG. 2 shows an enlarged cross section of the closure means according to FIG. 1, with a valve housing and a valve body.

Details of the structure of the closure means 41 designed as a rotary slide valve can be more clearly seen in FIG. 2. The valve housing 61 comprises a pipe-shaped outer shell 95 of steel and a pipe-shaped inner shell 97 of ceramics. The inner shell 97 is fixed in the outer shell 95 by a press fit. Radially inside of the inner shell 97, the valve body 67 is disposed with a slight radial play referring to the inner shell 97, with the valve body 67 being axially slightly shorter than the inner shell 97. The axial position of the valve body 67 in the inner shell 97 is determined by an upper and a lower cover 99, 101. The upper cover 99 lies with its face against the upper end, and the lower cover 101 lies with its face against the lower end of the inner shell 97. The upper and the lower covers 99, 101, likewise made of ceramic material, each possess a centric bore. The axial positions of the inner shell 97 and of the upper and the lower covers 99, 101 in the outer shell 95 are determined by locking rings 103, 104 engaging in corresponding grooves in the outer shell 95. In addition, a support disk 105 and a sealing ring 107 are provided between the lower cover 101 and its associated locking ring 103, and a sealing ring 108 and a bell-shaped cap 109 are provided between the upper cover 99 and the upper locking ring 104. A hollow space 115 exists between the cap 109 and the upper cover 99. The motor shaft of the rotary drive 69 extends through a centric bore in the cap 109 to the upper face 70 of the valve body 67. A stud 111 protruding from the face 70 is press-fitted to the motor shaft of the rotary drive 69. The cap 109 further has an inlet connection piece 113 connected via a conduit to the compressed air source 43. A connection 63 and a connection 65 are provided for the container 11 on the valve housing 61, with the connection 65 being connected via a conduit 88 to the container inlet 15 for compressed air and scavenging air, and the connection 63 being connected via a conduit 89 with the container outlet 19 for nitrogen.

Figure 3:
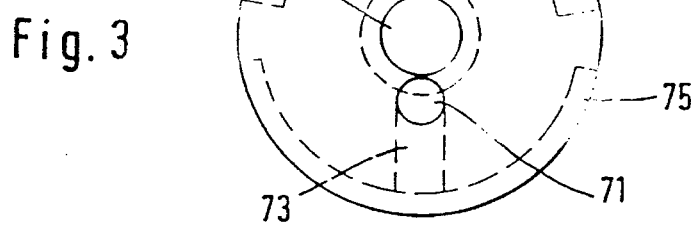
FIG. 3 shows an enlarged plan view onto the valve body according to FIG. 2.

In FIG. 3 the upper face 70 of the valve body 67 is shown. In addition to an eccentrically located axial inlet bore 71 not passing all the way through, radial bores 73, 83, as well as a first and a second groove 75 and 85, respectively, can be seen in broken lines, their purpose being explained below.

Figure 4:
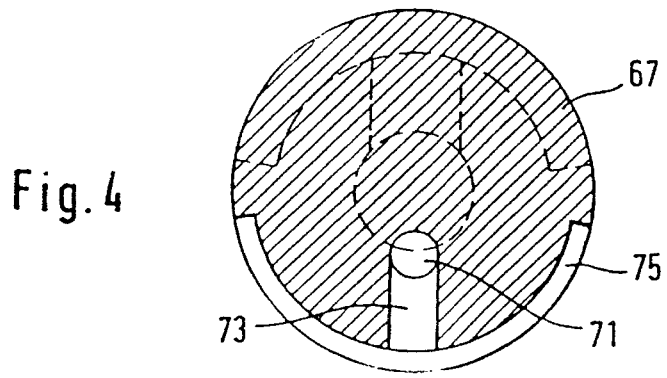
FIG. 4 shows a sectional view of the valve body along line 4—4 in FIG. 2.

In FIG. 4 the axial inlet bore 71 can again be seen. The axial inlet bore 71 communicates via the radial bore 73 with the groove 75 located on the periphery of the valve body 67. The groove 75 extends from the radial bore 73 uniformly over less than 180° along the periphery of the valve body 67.

Figure 5:
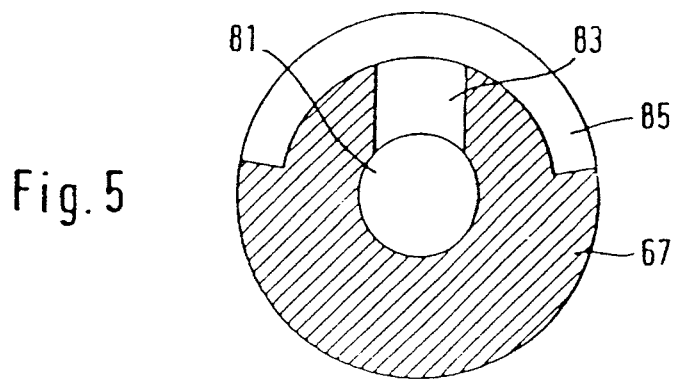
FIG. 5 shows a sectional view of the valve body along line 5—5 in FIG. 2.

In FIG. 5 a centrically arranged outlet bore 81, the radial bore 83 and the groove 85 are shown in the valve body 67. The outlet bore 81 extends axially from a lower face 79 into the interior of the valve body 67, but without passing through it. The groove 85 communicates via the radial bore 83 with the outlet bore 81. The diameters of the outlet bore 81 and of its radial bore 83 are larger than the diameters of the inlet bore 71 and of its radial bore 73, as FIGS. 4 and 5 reveal. Furthermore, the radial depth and the axial height of the groove 85 are greater than those of the groove 75, as the drawings show. The position of the groove 85 is displaced by 180° from the position of the groove 75.

The mode of operation of the apparatus will now be described in detail on the basis of the drawings.

Compressed air flows from the compressed air source 43 into the hollow space 115 of the closure means 41 and, if the valve body 67 of the closure means 41 is in an opened position for feeding compressed air to the right-hand container 11, the compressed air flows via the axial inlet bore 71 into the valve body 67. The valve body 67, namely, is constantly driven at a slow rotating speed determining the cycle times of the apparatus. The compressed air then flows on via the radial bore 73, the groove 75, the right-hand connection 65 and the conduit 88 to the container inlet 15 for compressed air and scavenging air. Prior to the entry of compressed air, the interior of the container 11 is at atmospheric pressure. The compressed air subsequently permeates the packed zeolite bed 13, which adsorbs nitrogen molecules. The oscillation generator 25 causes the container 11 and the packed zeolite bed 13 disposed therein to oscillate during the adsorption and desorption. Without the oscillation generator 25, there would possibly be a lower yield of oxygen-enriched air. The pressure in the container 11 rises quickly until a certain pressure value is reached at which the adsorption of nitrogen takes place. During the adsorption the packed zeolite bed 13 increases its volume, additionally raising the pressure within the container 11. Until the certain pressure value in the container 11 is reached, the wall 51 expands and the expansion screws 59 undergo a change in length via the wall 51 and the upper and lower plates 55, 57. The lower portion 33 is pressed downward and the upper end of the container is pressed upward in the region of the container outlet 23. Since, however, the container 11 is elastically prestressed via the pressure adjusting device 53, the chamber inlet 17 is only opened from the certain pressure value onward, in that due to the container expansion the upper portion 31 is drawn upward by the ascending pipe 37 and the lower portion 33 moves downward, the pressure value lying in the range of between 2 and 2.5 bars, depending on the type of packed zeolite bed 13, and being determined by the setting of the pressure adjusting device 53.

As the oxygen-enriched air is heavier than the compressed air and the nitrogen, it sinks to the lower end of the container 11 where the chamber 27 is located. The oxygen-enriched air then flows into the chamber 27 via the chamber inlet 17. Zeolite dust also blown into the chamber 27 is prevented by the particle filter 35 from entering the ascending pipe 37, so that filtered oxygen-enriched air opens the check valve 20 in the ascending pipe 37 and thus leaves the container 11 through the ascending pipe 37 and arrives at a consumer through conduits not shown. While the oxygen-enriched air is leaving the container 11, a continuous stream of so much additional compressed air flows into the container 11 that a severe pressure drop to below the certain pressure value necessary for adsorption is avoided. It is important for the adsorption that the pressure in the chamber 27 be built up as quickly as possible and that it subsequently remain relatively constant, so that a sort of rest phase sets in, during which the adsorption can take place.

During this adsorption process the valve body 67 continuously rotates further, until the groove 75 no longer communicates with the connection 65. At the end of the adsorption phase, after the closure means 41 has been closed, the pressure in the container 11 drops rapidly and its chamber 27 closes again.

While the right-hand container 11 was carrying out the adsorption just described, the left-hand container 11' was being desorbed. As soon as the valve body 67 has turned sufficiently for the groove 75 to communicate with the left-hand connection 65', compressed air flows into the left-hand container 11' and the adsorption phase in the left-hand container 11' begins. Nearly simultaneously with the start of the adsorption phase in the left-hand container 11', which need not be described here in detail, as its course is the same as in the right-hand container 11, the desorption phase in the right-hand container 11 begins. The valve body 67 in this is turned so far that the groove 85 communicates with the right-hand connection 63. Residual compressed air left in the container 11, as well as adsorbed nitrogen can thereby flow via the container outlet 19 for nitrogen and the conduit 89 to the closure means 41 and further via the groove 85, the radial bore 83 and the axial outlet bore 81 to a collecting vessel or to a consumer. The large cross sections of all discharge conduits ensure that a rapid pressure drop occurs in the container 11, whereby the strength of the bonds of the nitrogen molecules to the zeolite is lessened and the nitrogen molecules can be released. During the desorption phase the chamber 27 is always closed. Shortly before the groove 85 has turned so far that there is no further communication with the right-hand connection 63, the groove 75 already communicates again with the right-hand connection 65. The packed zeolite bed 13 thereby receives a burst of scavenging air, whereby it is briefly flushed. Further nitrogen molecules are swept along in this way and leave the container 11 together with the scavenging air via the container outlet 19 for nitrogen. When the valve body 67 is further rotated, the closure means 41 arrives at a position closed to the outflowing nitrogen.

The desorption is improved by the scavenging process, wherein the scavenging air can be compressed air, as in the embodiment just described. Furthermore, however, it is possible to use a portion of the oxygen-enriched air as scavenging air. For this the closure means 41 would have to have an additional inlet connection piece and a third groove leading via a scavenging air conduit to a separate container inlet for scavenging air. Although the introduction of oxygen-enriched air improves the desorption and increases the degree of purity of the oxygen-enriched air, it also reduces the yield of oxygen-enriched air.

Industrial Applicability

In one usage in a motor vehicle, the oxygen-enriched air is fed to the carburetor or to the combustion chamber, and the scavenging air is released into the atmosphere together with the nitrogen. The emission of pollutants of the motor vehicle is clearly reduced, as has been proved in prototypes. When used in an aeroplane, the oxygen-enriched air is conducted, for instance, to the passenger area and the remaining air is fed to the engine. The nitrogen being released is no longer expelled, but is rather conducted to the fuel tanks of the aeroplane, where the nitrogen acts as an inert gas reducing the danger of explosion of fuel vapours in the fuel tanks.

I claim:

1. An apparatus for the oxygen enrichment of air, with at least one container (11) holding a packed zeolite bed (13) and having a container inlet (15) for compressed air, a container outlet (23) for oxygen-enriched air, a container inlet (15) for scavenging air and a container outlet (19) for nitrogen, characterized in that the container (11) includes a separate chamber (27) capable of being opened and gastightly closed relative to the interior of the container (11) by means of the internal container pressure and comprising an upper and a lower portion (31, 33) separable from one another by the internal container pressure, thus producing an annular gap as a chamber inlet (17) said chamber (27) having a chamber outlet (29) connected to the container outlet (23).

2. The apparatus according to claim 1, characterized in that an ascending pipe (37) forms the connection between the chamber outlet (29) and the container outlet (23).

3. The apparatus according to claim 2, characterized in that the container (11) posseses a flexible wall (51) movable by the internal container pressure, with the ascending pipe (37) being securely connected to said wall.

4. The apparatus according to claim 1, characterized in that a particle filter (35) is disposed before the container outlet (23).

5. The apparatus according to claim 4, characterized in that the particle filter (35) is disposed in the chamber (27).

6. The apparatus according to claim 1, characterized in that an oscillation generator (25) capable of causing the packed zeolite bed (13) to oscillate at high frequency is connected to the container (11).

7. The apparatus according to claim 6, characterized in that the oscillation generator (25) is a piezoelement.

8. The apparatus according to claim 1, with a controllable closure means (41), characterized in that the container inlet (15) for compressed air, the container inlet (15) for scavenging air, the container outlet (19) for nitrogen and a compressed air source (43) are connected in common to the closure means (41).

9. The apparatus according to claim 8, characterized in that the container inlet (15) for compressed air and the container inlet (15) for scavenging air are one and the same container inlet alternately suppliable with compressed air and scavenging air via the closure means (41).

10. The apparatus according to claim 8, characterized in that the closure means (41) consists partly or entirely of ceramic material.

11. The apparatus according to claim 8, characterized in that the closure means (41) is designed such that during the opening of the container outlet (19) for nitrogen the container inlet (15) for scavenging air is opened at least for a short time.

12. The apparatus according to claim 8, wherein at least two containers (11) capable of being reciprocally charged with compressed air and scavenging air are provided.

13. The apparatus according to claim 12, characterized in that the closure means (41) consists partly or entirely of ceramic material.

14. The apparatus according to claim 12, characterized in that the closure means (41) is a rotary slide valve having a valve housing (61) with connections (63, 65) for the container inlets and outlets (15, 19), and a valve body (67) rotatable in the valve housing (61), which valve body is capable of being caused to rotate by a rotary drive (69).

15. The apparatus according to claim 14, characterized in that the valve body (67) has on a first face (70) an axial inlet bore (71) not passing through, connected via a radial bore (73) to a first groove (75) on the periphery of the valve body (67), and that the first groove (75) communicates in an opened position with the connection (65) for the container inlet (15) for compressed air and scavenging air.

16. The apparatus according to claim 15, characterized in that on a second face (79) of the valve body (67) an axial outlet bore (81) not passing through is provided, said bore being connected via a radial bore (83) to a second groove (85) on the periphery of the valve body (67), and that the second groove (85) communicates in an opened position with the connection (63) for the container outlet (19) for nitrogen.

17. The apparatus according to claim 16, characterized in that the outlet bore (81), its associated radial bore (83) and the connection (63) for the container outlet (19) for nitrogen have a larger cross sectional area than the inlet bore (71), its associated radial bore (73) and the connection (65) for the container inlet (15) for compressed air and scavenging air, and that the second groove (85) has a larger axial width than the first groove (75).

18. The apparatus according to claim 16, characterized in that the peripheral positions of the grooves (75, 85) are coordinated with one another such that at first, solely the first groove (75) is in an opened position and subsequently, solely the second groove (85) is in an opened position, and prior to the complete closing of the second groove (85), the first groove (75) is again in an opened position.

19. The apparatus according to claim 14, characterized in that a d.c. motor is provided as the rotary drive (69) of the valve body (67).

20. The apparatus according to claim 1, characterized in that a check valve (20) is provided at the container outlet (23) for oxygen-enriched air.

21. The apparatus according to claim 1, characterized by a pressure adjusting device (53) for setting the value of the internal container pressure at which the chamber (27) is opened.

22. The apparatus according to claim 21, characterized in that the pressure adjusting device (53) is a mechanical prestressing device connected to the wall (51) of the container (11).

* * * * *